No. 610,656. Patented Sept. 13, 1898.
J. L. MARTIN.
BICYCLE HANGER.
(Application filed Apr. 5, 1898.)
(No Model.)
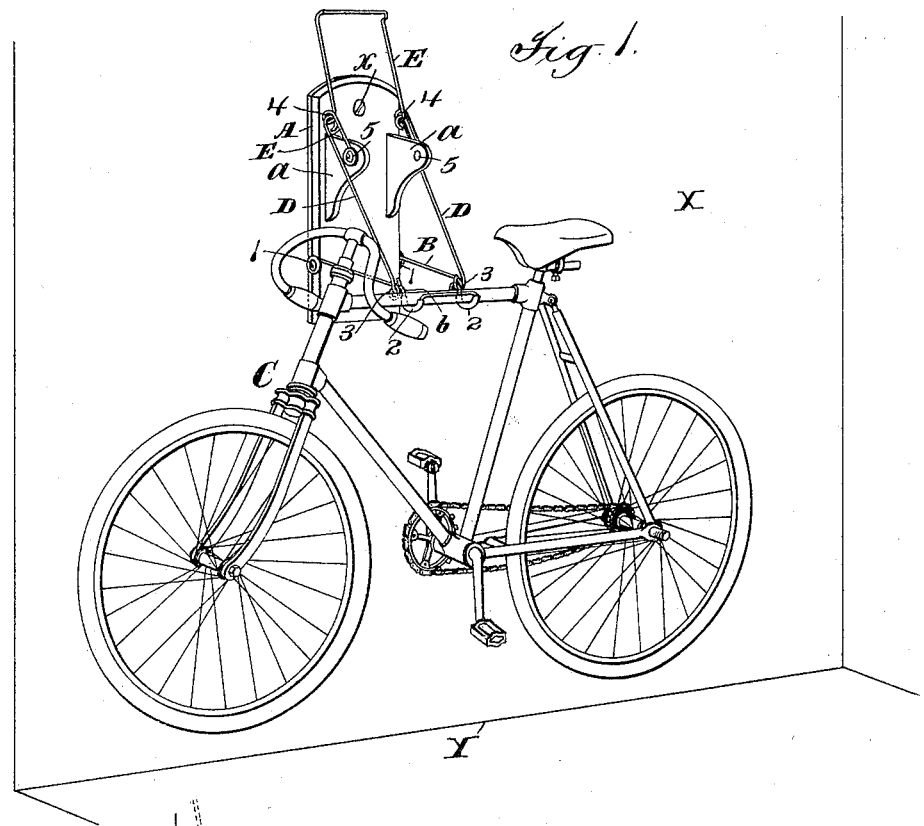
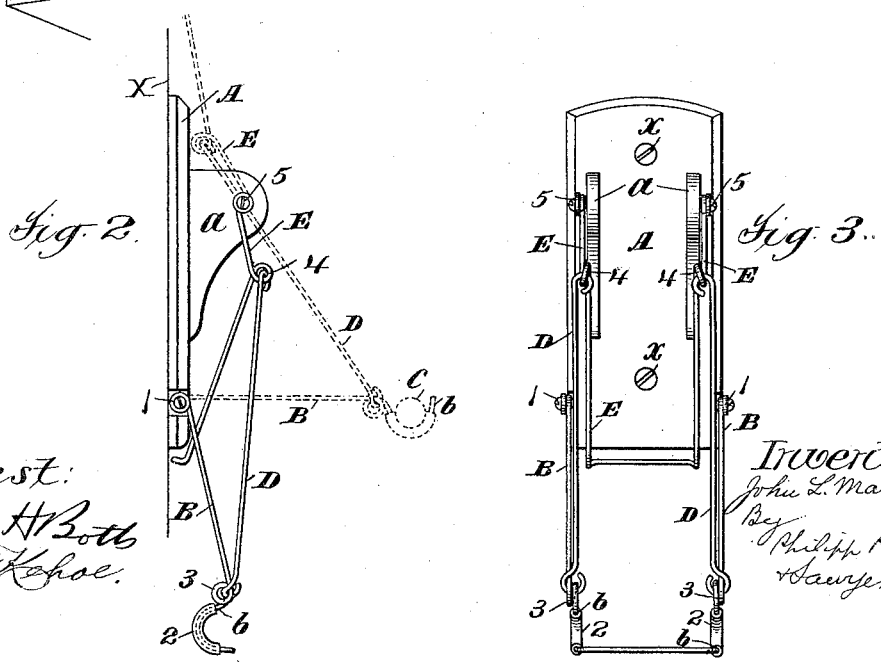
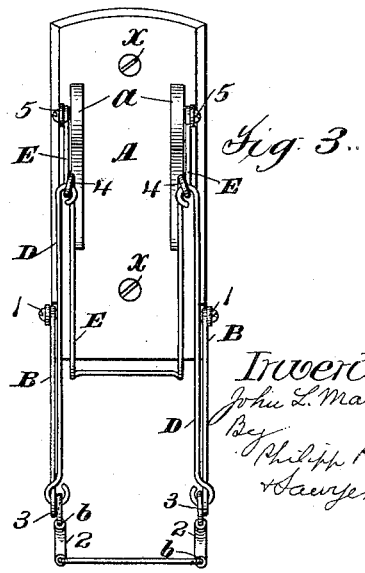

UNITED STATES PATENT OFFICE.

JOHN L. MARTIN, OF NEW YORK, N. Y.

BICYCLE-HANGER.

SPECIFICATION forming part of Letters Patent No. 610,656, dated September 13, 1898.

Application filed April 5, 1898. Serial No. 676,532. (No model.)

*To all whom it may concern:*

Be it known that I, JOHN L. MARTIN, a citizen of the United States, residing at New York, county of Kings, and State of New York, have invented certain new and useful Improvements in Bicycle-Hangers, fully described and represented in the following specification and the accompanying drawings, forming a part of the same.

This invention relates to an improved bicycle-hanger, the object being to provide a simple, cheap, and convenient device by which a bicycle may be raised from the floor and properly supported close to a wall or other support, so that the bicycle shall be firmly held in vertical position without its tires resting upon the floor, and readily and conveniently returned to the floor and released from the device.

In the accompanying drawings, which illustrate a construction embodying my invention in its preferred form as applied to supporting a diamond-frame bicycle, Figure 1 is a perspective view of the hanger shown as supporting the bicycle. Fig. 2 is a side view of the same with the hanger shown in full lines in position before the bicycle is raised and in dotted lines with the bicycle raised and supported as in Fig. 1, and Fig. 3 is a front view of the hanger.

Referring to said drawings, A is a block of wood or similar material adapted to be secured to the wall of a room or other suitable fixed support and provided with brackets *a*, projecting from the face of the block a sufficient distance to provide for the proper mounting of the operating parts. The block A is shown as secured by screws *x* to the wall X at a suitable distance above the floor-line Y of a room. Pivoted at I upon the opposite side edges of the block A are the two arms of a lever B, which carries at its front end hooks or supports *b*, formed by curved portions or loops at the ends of the arms and adapted to receive and hold the back bar *c* of a bicycle C, these hooks *b* preferably being provided with coverings 2 of rubber, cloth, or similar material to prevent marring the bar *c*. The lever B is preferably formed of a single piece of strong wire or metal rod, as shown, bent to the proper shape, with the loop of the wire forming the outer end of the lever and the free ends of the wire forming the two arms by which it is pivoted to the opposite side edges of the support A, the hooks *b* thus being just inside the loop of the wire at the front end of the lever and connected by the loop-bar, forming a very strong and rigid construction. This lever B is preferably provided with eyes 3 near its front end and preferably just in the rear of the hooks *b*, as shown, these eyes being preferably formed by loops in the wire of lever B, by which eyes the lever B is engaged on opposite sides by links D, preferably formed, as shown, of wires having their opposite ends bent to form loops and hooked into the eyes 3 at their lower ends and at their upper ends into similar eyes 4 formed in a lever or handle E, which is preferably formed in the same manner as lever B by bending a single piece of strong wire or metal rod into the proper shape, with the loop of the wire forming the handle and its free ends pivoted at 5 to the outer side of the brackets *a* on block A. The handle E is pivoted to the brackets *a* at such a distance from the block A that the lever E is swung past the dead-center when the lever B is swung into horizontal position with the bicycle raised, and the pull of the links D tends to draw the lever rearward and against the block or wall, so that the lever is thus locked in position when the hanger is in use, this self-locking of the lever E assuring the proper support of the bicycle with a light and cheap construction of the supporting parts and avoiding the use of a latch or other special device for securing the parts in place with the bicycle raised.

The operation of the construction will be understood from the drawings with a brief description. As shown in full lines in Fig. 2 the device is in its normal position when not in use, with the handle-lever E thrown down, in which position it will be seen that all parts of the device lie close to the wall, so as to be practically entirely out of the way. The bicycle to be supported is run into position in front of the device close to the wall, with the top bar *c* in proper position so that the hooks *b* of the lever B, forming the bicycle-support, will catch the bar as the lever swings outward and upward. The handle-lever E is then grasped by the loop and pulled forward and upward, thus raising the lever B, so as to catch the top bar c and raise the bicycle from the floor, and as the lever B reaches the horizontal position, with the bicycle raised from the floor, the handle E is thrown fully over into the position shown in full lines in Fig. 1 and in dotted lines in Fig. 2, in which position of this lever the weight of the bicycle on the hooks b at the outer end of the lever B tends to pull the lever E rearward by the links D, so as to lock the parts in this position. The position of all the parts with the bicycle thus supported free from the floor is shown clearly in Figs. 1 and 2.

While the operating parts of my bicycle-hanger are preferably formed of wire or metal rod and the form of the parts is preferably that shown, such construction being very cheap and efficient in use and forming in itself a part of the invention, it will be understood that the parts of the support may be made otherwise and of any suitable material while including the broader features of the invention, and other modifications within the invention may be made by those skilled in the art.

What I claim is—

1. In a bicycle-hanger, the combination with a support mounted to swing vertically and transversely to a wall and adapted to engage a bicycle and raise it from the floor as the support moves upward, of a vertically-swinging handle-lever and connections to the support for actuating the latter, said handle-lever being mounted to swing past the dead-center when the support is swung upward to position of use with the bicycle raised from the floor, substantially as described.

2. In a bicycle-hanger, the combination with a support for the bicycle, of a lever carrying the support at its outer end and mounted to swing vertically to move the support outward and upward and arranged to raise the bicycle off the floor when the lever is raised to substantially horizontal position, and a vertically-swinging handle-lever and connections for actuating the lever carrying the support and hinged to swing past the dead-center for locking said levers in position with the bicycle raised, substantially as described.

3. A bicycle-hanger consisting of the block A adapted to be secured to a wall or similar support, and having brackets a, lever B pivoted to the block to swing vertically and transversely to the wall and having a hooked bicycle-support at the outer end of the lever, handle-lever E pivoted in said brackets, and links D connecting said levers, said lever E being mounted to swing rearward past the dead-center when the lever B is raised, substantially as described.

4. The combination with lever B formed of a single piece bent to form two lever-arms with the loop at the outer end of the lever and hooks b inside the loop, of lever E formed of a single piece bent to form two lever-arms with the loop forming a handle at the outer end of the lever, and links D connecting lever E to the lever B inside the hooks b, substantially as described.

In testimony whereof I have hereunto set my hand in the presence of two subscribing witnesses.

JOHN L. MARTIN.

Witnesses:
C. J. SAWYER,
T. F. KEHOE.